(12) United States Patent
Baraff

(10) Patent No.: US 7,864,181 B1
(45) Date of Patent: Jan. 4, 2011

(54) SHAPE FRICTION: SHAPE PRESERVATION OF SIMULATED OBJECTS IN COMPUTER ANIMATION

(75) Inventor: David Baraff, Oakland, CA (US)

(73) Assignee: Pixar, Emeryville, CA (US)

( * ) Notice: Subject to any disclaimer, the term of this patent is extended or adjusted under 35 U.S.C. 154(b) by 777 days.

(21) Appl. No.: 11/758,984

(22) Filed: Jun. 6, 2007

Related U.S. Application Data

(60) Provisional application No. 60/812,679, filed on Jun. 8, 2006.

(51) Int. Cl.
*G06T 15/00* (2006.01)
(52) U.S. Cl. .................. 345/475; 345/473; 345/474
(58) Field of Classification Search ............ 345/473, 345/474, 475
See application file for complete search history.

(56) References Cited

U.S. PATENT DOCUMENTS

| | | | |
|---|---|---|---|
| 6,909,431 B1 | 6/2005 | Anderson et al. | |
| 7,206,729 B2 * | 4/2007 | Baraff et al. | 703/7 |
| 7,298,374 B2 * | 11/2007 | Styles | 345/473 |
| 7,385,601 B2 * | 6/2008 | Bingham et al. | 345/420 |
| 7,463,265 B2 * | 12/2008 | Styles | 345/473 |
| 7,652,670 B2 * | 1/2010 | Styles | 345/473 |

* cited by examiner

*Primary Examiner*—Phu Nguyen
(74) *Attorney, Agent, or Firm*—Townsend and Townsend and Crew LLP

(57) ABSTRACT

A method for simulating objects includes receiving a target shape associated with a simulated object. A difference is determined between the target shape and a measured shape associated with the simulated object. One or more forces are generated to act on the simulated object to reduce the difference between the target shape and the measured shape. The target shape may be updated when the difference between the target shape and the measured shape exceeds a predetermined tolerance. Updating the target shape may include reducing the target shape to move the target shape closer to the measured shape.

32 Claims, 6 Drawing Sheets

SHAPE FRICTION: SHAPE PRESERVATION OF SIMULATED OBJECTS IN COMPUTER ANIMATION

CROSS-REFERENCES TO RELATED APPLICATIONS

This application claims the benefit of and priority to U.S. Provisional Patent Application No. 60/812,679, filed Jun. 8, 2006 and entitled "Shape Friction: Shape Preservation of Simulated Objects in Computer Animation," the entire disclosure of which is herein incorporated by referenced for all purposes.

This application is related to U.S. patent application Ser. No. 11/758,969, filed Jun. 6, 2007 and entitled "Methods and Apparatus for Auto-scaling Simulated Objects", and U.S. patent application Ser. No. 11/758,989, filed Jun. 6, 2007 entitled "Velocity Drag: Shape Preservation of Simulated Objects in Computer Animation", the entire disclosures of which are herein incorporated by referenced for all purposes.

BACKGROUND OF THE INVENTION

The present invention relates to computer animation. More specifically, the present invention relates to methods and apparatus for preserving the shape of simulated objects using techniques for shape friction.

In computer graphics imagery, motions and positions of secondary objects, such as hair, clothing, and plants are usually too complex for a human animator to directly control at every stage of a computer animation. Instead, the human animator specifies the physics and/or physical properties of the secondary or simulated objects. A computer program then employs physically-based numerical methods and techniques to simulate the motions and positions of the secondary objects over time based on the physics or physical properties of the individual secondary objects.

For simulated clothing objects, for example, the animator specifies the physical properties and construction of the cloth. For example, the animator specifies how the cloth bends due to forces or collisions with solid objects. The animator further specifies how the cloth deforms or collides with itself. Moreover, the animator specifies external forces that act on the cloth, such as gravity and wind.

In addition to modeling the physical properties of the simulated objects, the animator specifies motions and positions of kinematic or non-simulated objects (e.g., characters upon which the clothing objects rest). The animation of a non-simulated object generally is independent of and otherwise unaffected by motions and positions of simulated objects. However, the motions and positions of the non-simulated objects often are the principal influencer of motions and positions of simulated objects, as clothing and hair are likely to be associated with a kinematic character.

Consider a computer animation of a human character standing upright, wearing a jacket. The human character is a kinematic or non-simulated object that is directly animated by the skilled human animator. The animator specifies the physics (e.g., the physical properties) of the jacket which is a simulated object. In addition, the animator models how the jacket is associated with and worn by the human character. During simulation, the computer program simulates the motions and positions of the jacket using physically-based numerical techniques in response to external forces and the motions and positions of the human character.

If the physical properties and external forces acting on a simulated object are accurately modeled, the resulting motion of the simulated object will be plausible and seemingly realistic. In our jacket example, the cloth of the jacket should hang down and fold naturally. Furthermore, the cloth should react according to the motions and positions of the human character when the human character wears the jacket. However, modeling the simulated objects to be truly accurate is a delicate balance between the limitations and complexities of the animator's knowledge of physics and particle systems on the one hand and budgetary and time constraints on the other.

In addition, other problems exists with physically-based numerical methods and techniques used in computer animations. A particularly difficult problem in the simulation of secondary or simulated objects, such as cloth, is dealing with creeping or oozing behaviors. A creeping or oozing behavior occurs when motion of a simulated object associated with a non-simulated object continues in a visually unpleasing manner after a change in motion of the non-simulated object.

In the real world, most garments such as shirts, jackets, or pants undergo no significant movement or change in shape when their wearers cease moving. Internal forces in clothes, and friction between the clothes and their wearer, generally lock the clothes into a fixed position when the wearer's motion ceases. Typically, the clothes stops moving far less than a second after the wearer does. Although some garments, such as long dresses or ties, typically swing back and forth for some period of time, this desired and realistic motion is different from undesirable creeping or oozing behaviors that result during simulation using physically-based numerical methods and techniques.

Creating simulation programs for simulated objects, such as cloth, that can achieve the same effect after the wearer ceases moving has been difficult. One solution is to instruct the computer program during the simulation of our jacket example to freeze the cloth of the jacket in place whenever the human character ceases moving. The cloth then would be allowed to move again, when the human character begins to move. A problem with this solution is that our human character rarely remains exactly motionless. Typically, even when an animated character ceases movement, some small amount of "keep-alive" motion is applied. For example, the animator may rotate limbs of the character a few degrees or have the character sway back and forth just a little. It is during keep-alive motion, that the creeping or oozing of simulated objects is most apparent.

Accordingly, what is desired are improved methods and apparatus for solving the problems discussed above, while reducing the drawbacks discussed above.

BRIEF SUMMARY OF THE INVENTION

The present invention relates to computer animation. More specifically, the present invention relates to methods and apparatus for preserving the shape of simulated objects using techniques for shape friction.

In various embodiments, a method for simulating objects includes receiving a target shape associated with a simulated object. A difference is determined between the target shape and a measured shape associated with the simulated object. One or more forces are generated to act on the simulated object to reduce the difference between the target shape and the measured shape.

In some embodiments, the target shape is updated when the difference between the target shape and the measured shape exceeds a predetermined tolerance. Updating the target shape may include reducing the target shape to move the target shape closer to the measured shape. Receiving the target shape associated with the simulated object may include receiving a target distance between a first particle associated with the simulated object and a second particle associated with the simulated object.

Distance may be measured between a first particle associated with the simulated object and a second particle associated with the simulated object to determine the measured shape associated with the simulated object. Determining the difference between the target shape and the measured shape associated with the simulated object may include determining a difference between a target distance and a measured distance. Determining the difference between the target shape and the measured shape associated with the simulated object may include determining a difference between a target displacement and a measured displacement.

In one embodiment, the amount of the one or more forces is reduced. Reducing the amount of the one or more forces may include reducing the amount of the one or more forces based on a scaling factor determined in response to a difference between velocity of a first particle associated with the simulated object and velocity of a second particle associated with the simulated object as the difference between velocities approaches a predetermined threshold. Shape of the simulated object may be determined in response to a reference object associated with the simulated object when a difference in velocities associated with the simulated object exceeds a predetermined threshold. The reference object may include a non-simulated character object. The simulated object may include a cloth object.

In various embodiments, a computer program product is stored on a computer readable medium for simulating objects. The computer program product includes code for receiving a target shape associated with a simulated object, code for determining a difference between the target shape and a measured shape associated with the simulated object, and code for generating one or more forces to act on the simulated object to reduce the difference between the target shape and the measured shape.

In some embodiments, a system for simulating objects includes a processor and a memory coupled to the processor. The memory is configured to store a set of instructions which when executed by the processor cause the processor to receive a target shape associated with a simulated object, determine a difference between the target shape and a measured shape associated with the simulated object, and generate one or more forces to act on the simulated object to reduce the difference between the target shape and the measured shape.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

The present invention relates to computer animation. More specifically, the present invention relates to methods and apparatus for preserving the shape of simulated objects using techniques for shape friction.

In various embodiments, simulated objects are elements of a computer animation display. The computer animation display may include simulated objects (e.g., secondary or dynamic object) such as cloth, garments and clothing, hair, and fur. The computer animation display may further include reference objects (e.g., kinematic, non-simulated objects, or other simulated objects), such as characters and/or collision objects.

Typically simulated objects are model, described, or represented as a collection of particles, connected to each other in some manner. In one example, a topological mesh is used in the case of clothing. In another example, a collection of strands or linear objects are used to describe hair or fur. Techniques of the present invention allow a simulation computer program to better display in visually desirable manners simulated objects that response to changes in motions and positions of reference or non-simulated objects.

Figure 1:
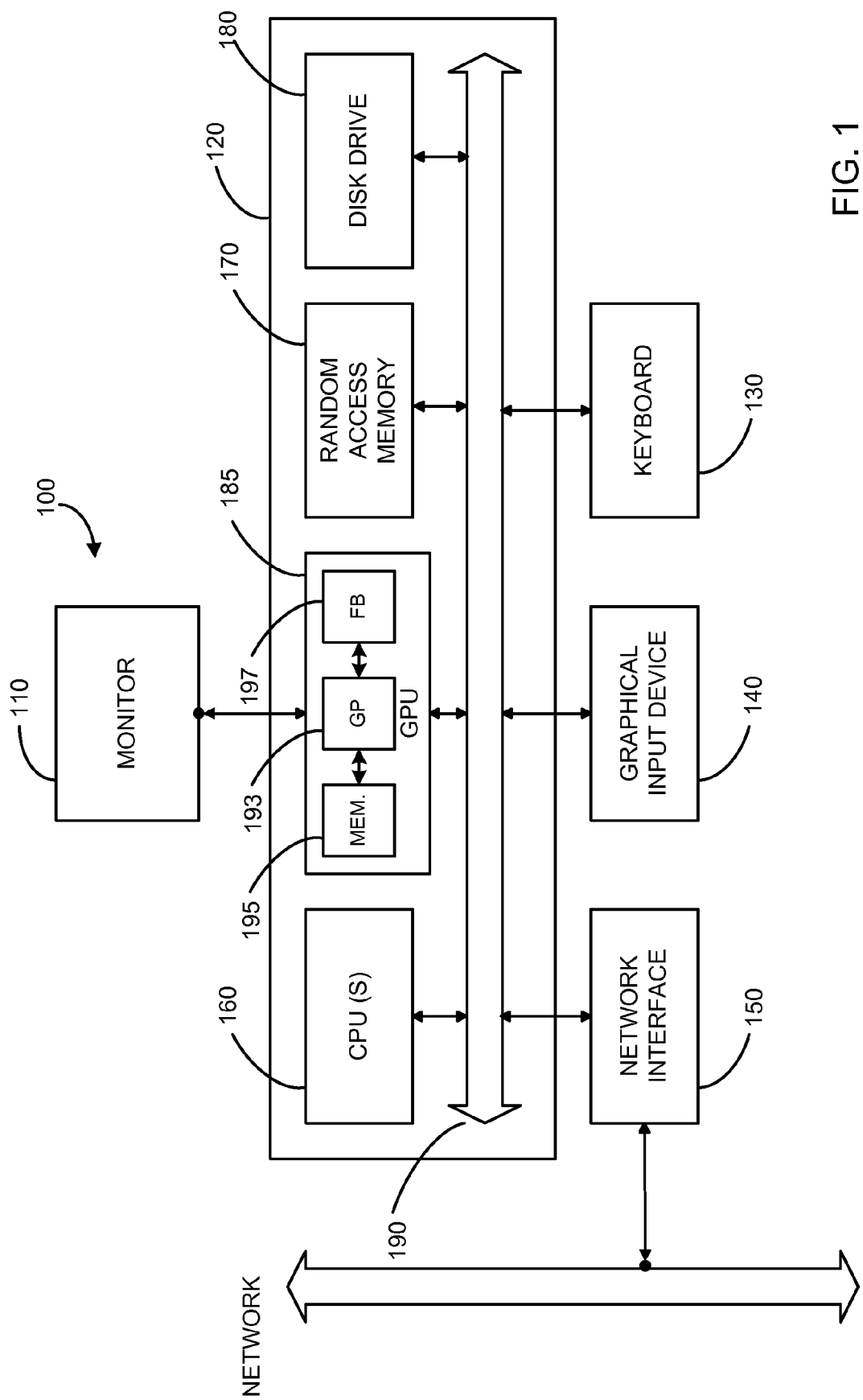
FIG. 1 is a block diagram of typical computer system according to an embodiment of the present invention.

FIG. 1 is a block diagram of typical computer system 100 according to an embodiment of the present invention.

In one embodiment, computer system 100 includes a monitor 110, computer 120, a keyboard 130, a user input device 140, computer interfaces 150, and the like.

In various embodiments, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, and may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In some embodiments, computer 120 includes one or more Xeon microprocessors from Intel. Further, in one embodiment, computer 120 includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In this example, GPU 185 includes a graphics processor 193, a number of memories and/or registers 195, and a number of frame buffers 197.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In various embodiments, computer system 100 allows an animator to preserve or maintain the shape of simulated objects, such as cloth and hair, to provide visually appealing animations.

Consider an example in which a jacket (i.e., a simulated object) is associated with an animated character (i.e., a non-simulated or kinematic object). In this example, the character has been walking, but has just stopped. The motions of the jacket may be simulated as influenced by the motions of the character using traditional physically-based numerical techniques. Accordingly, due to traditional physically-based numerical techniques, folds and wrinkles under the arms and down the torso of the character remain in motion until settling down after the character has remained motionless for a few seconds.

This undesired action of the jacket (e.g., the creeping or oozing of the cloth of the jacket) is visually displeasing during animation. In response to traditional physically-based numerical techniques, a slow creeping or oozing starts under the arms and down the torso of the character. The creeping or oozing occurs even though the overall difference between when the character stops moving and when the motion of the jacket settles is small.

According to various embodiments, computer system 100 enables shape preservation using techniques for shape friction during simulation of objects in a computer animation display. For example, a simulated object may be associated with a reference object (e.g., a non-simulated object). Motions and positions of the simulated object may be influenced by motions and positions of the non-simulated object. Additionally, the motions and positions of the simulated object may be simulated using physically-based numerical techniques.

In these embodiments, computer system 100 receives a reference or target shape associated with the simulated object. Computer system 100 then determines a different between the target shape and a measured shape (e.g., the current shape) of the simulated object. While there exists a difference between the target shape and the measured shape, computer system 100 attempts to reduce the error between the target shape and the measured shape. To do so, computer system 100 may generate one or more forces to act on the simulated object to reduce the difference between the target shape and the measured shape.

In some embodiments, computer system 100 uses a measure of distance as the "shape" associated with a simulated object. The distance between a particles and a set of neighboring particles provides an acceptable measure of the shape of the simulated object. For example, a position of a first particle associated with the simulated object and a position of a second particle associated with the simulated object are determined. The second particle may be in the set of particles that neighbor the first particle.

Accordingly, computer system 100 enables simulated objects to be free to move in response to the motions of reference or non-simulated objects. When a difference between a target shape is measured or detected (e.g., in displacement, distance, velocity, etc.), the shape of the simulated object is preserved by applying one or more forces to particles such that the shape of the entire simulated object or a portion of the simulated object is maintained. In some embodiments, these forces acts like an internal friction force to maintain the shape of the simulated object and a provide a more visually pleasant simulation of the simulated object. In some embodiments, once motion of a reference or non-simulated object exceeds a predetermined threshold (e.g., a predetermined maximum velocity), the friction force preserving the shape is overcome, and the simulated object is free to fully move in response to the non-simulated object.

Figure 2A:
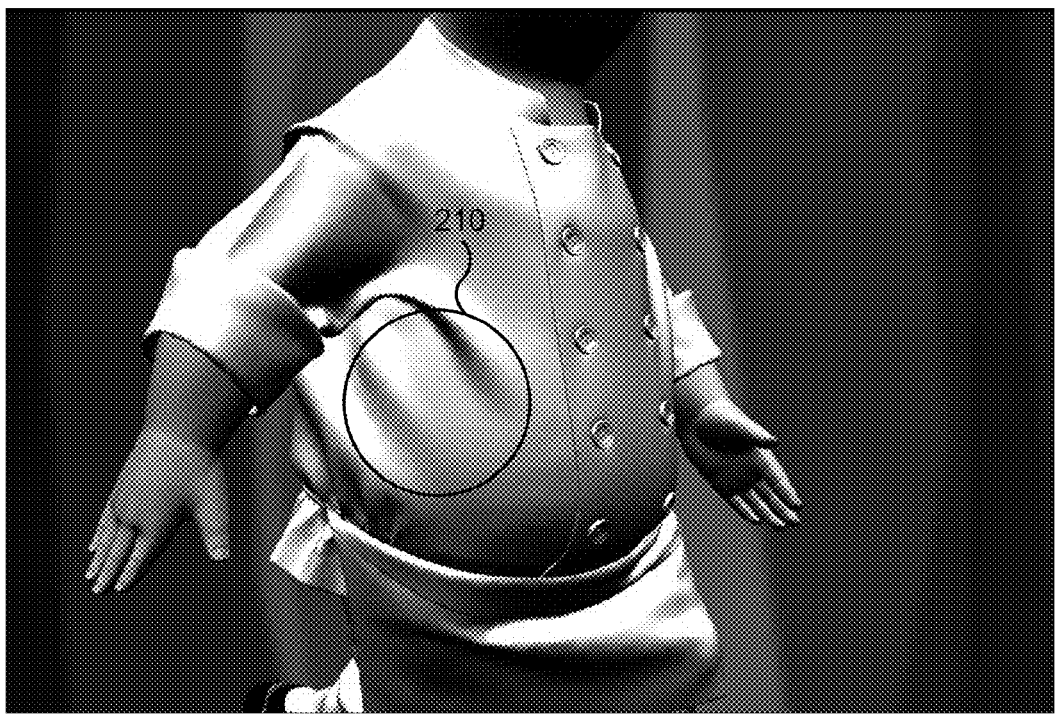
FIGS. 2A and 2B are screenshots of a human character wearing a jacket.
Figure 2B:
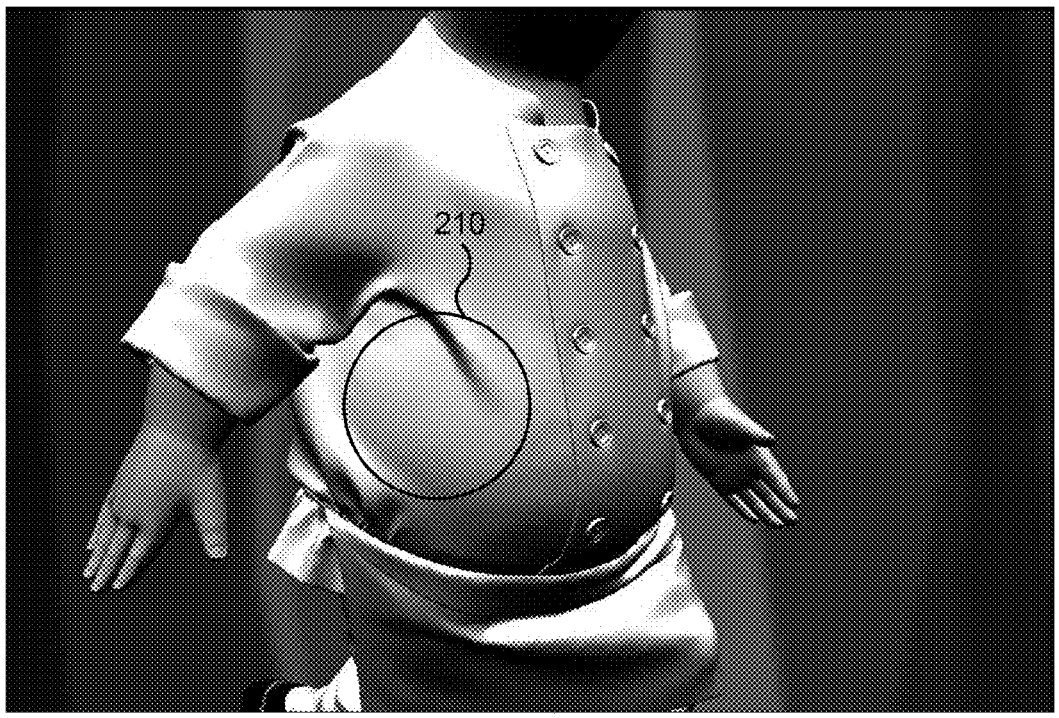

FIGS. 2A and 2B are screenshots of a human character wearing a jacket. FIG. 2A depicts a non-simulated human character who has just stopped walking. The human character is wearing a jacket that may be simulated by computer system 100 using a physically-based numerical technique. Additionally, the motions and positions of the jacket may be influenced by motions and positions of the human character as animated or posed by an animator.

In FIG. 2A, at the moment the human character ceases walking, there are folds and wrinkles in motion starting at the sleeve and down the torso of the human character in area 210. The folds and wrinkles continue moving in a creeping or oozing behavior for a small number of seconds after the human character stops walking.

FIG. 2B depicts the human character after the motion of the folds and wrinkles of the jacket stop. In this example, the crease line down the arm has changed slightly and the wrinkle across the right shoulder has shifted in area 210. Many of the folds and wrinkles along the torso have disappeared. The vertical wrinkle down the torso has smoothed out, and the cloth of the jacket appears to wear naturally on the human character.

Accordingly, in various embodiments, while the human character is walking, computer system 100 detects the motion of the jacket, and allows the folds and wrinkles in the cloth of the jacket to be simulated using physically-based numerical techniques. When the human character ceases walking, computer system 100 detects the changes in speed, direction, and the like.

Thus, computer system 100 automatically applies forces to particles that form the jacket to maintain the shape of the jacket according to various techniques to preserve the shape of the jacket. Therefore, the state of the jacket depicted in FIG. 2A is reached and remains at the point in time when the human character stops walking Advantageously, computer system 100 reduces or eliminates the creeping or oozing behavior of the cloth of the jacket from FIG. 2A to FIG. 2B after the characters stops moving.

In some embodiments, computer system 100 provides techniques to allow an animator to specify how positions of particles associated with a simulated object (e.g., the jacket of FIGS. 2A and 2B) relative to themselves are influenced by motions of a reference object or a non-simulated object (e.g., the human character of FIGS. 2A and 2B). For example, if the motions of the human character cause one or more metrics to exceed a predetermined threshold, such as when the character is moving normally, computer system 100 allows the jacket to change shape by adjusting the relative positions of particle of the jacket to allow the jacket to appear responsive to the characters motions. In other words, when the character is moving at or above a particular speed, computer system 100 allows the jacket to fold and wrinkle.

If the motions of the character do not cause one or more metrics to exceed a predetermined threshold, such as when the character is slightly moving or moving during "keep alive" motion, computer system 100 may apply one or more forces to the particles of the jacket, such as a friction force, to maintain the relative distances or positions between the particles of all or part of the jacket. Therefore, when the character slows down to under a particular speed or stops, computer system 100 advantageously preserves the shape of the jacket to prevent the appearance of the creeping or oozing folds and wrinkles.

In general, shape friction is a technique that allows computer system 100 to simplify the complicated frictional aspects arising from a multitude of contacts between simulated objects, such as cloth or hair. In the real world, friction is primarily a surface phenomenon, with forces generated where ever two surfaces come into contact. With regard to simulated cloth and hair, generally the effect of internal friction in cloth and hair is to make the cloth or hair hold a particular shape whenever externally imposed forces on the cloth or hair are low, and the cloth or hair is at rest. However, when the external imposed forces become large enough or if the velocity of the cloth or hair is large, the friction forces are overcome, and the cloth or hair can easily change it shape. Once the external forces seeking to move the cloth or hair become low again, and the cloth or hair has regained a low velocity, the friction forces once again serve to lock the cloth or hair into its new shape. Accordingly, in some embodiments, shape friction is applied to couple a simple three-dimensional model of a shape to internal 3-D forces (as opposed to 2-D frictional forces) in a way that emulates the response of cloth or hair to frictional forces.

Figure 3:
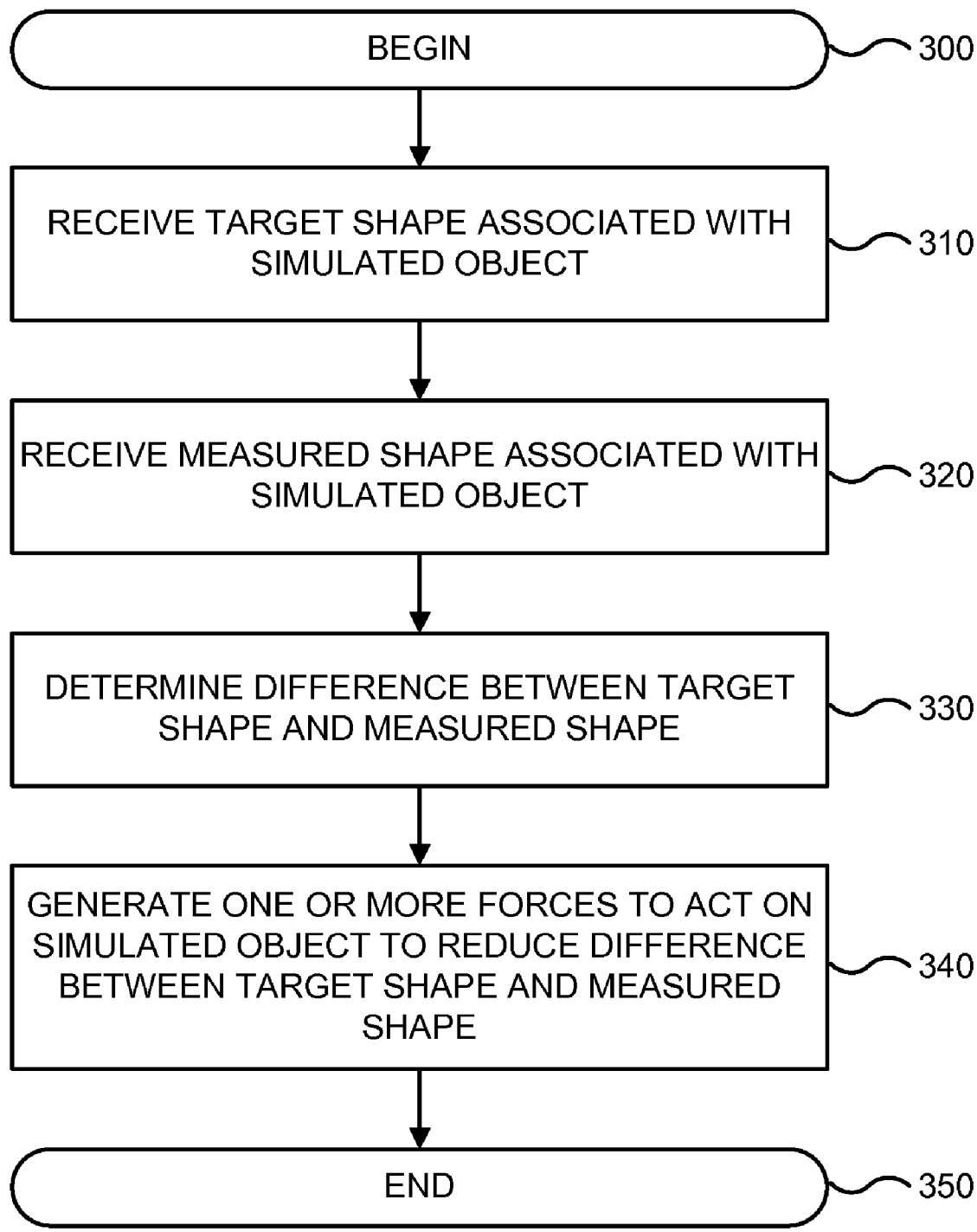
FIG. 3 is a simplified flowchart of a method for preserving shape of a simulated object using shape friction in one embodiment according to the present invention.

FIG. 3 is a simplified flowchart of a method for preserving shape of a simulated object using shape friction in one embodiment according to the present invention. The processing depicted in FIG. 3 may be performed by software modules (e.g., instructions or code) executed by a processor of a computer system, by hardware modules of the computer system, or combinations thereof. FIG. 3 begins in step 300.

In step 310, computer system 100 receives a reference shape or target shape associated with a simulated object. In one example, computer system 100 receives a target distance between a first particle associated with the simulated object and a second particle associated with the simulated object. In some embodiments, the second particle may be a single particle that is adjacent to or neighboring the first particle. In another example, the second particle may be found two or three particles out or away from the first particle. The second particle may also be or represent a set of one or more particles.

In step 320, computer system 100 receives a measured shape associated with simulated object. In one example, computer system 100 receives a metric associated with the first particle and the second particle. A metric is any value or measurement. For example, computer system 100 may receive a measurement of distance, velocity, acceleration, and the like. Speed or velocity may be measures as a derivative of a force acting on a particle. The metric may represent other higher order derivatives. Another example of the metric is a vector that represents the velocity and direction.

In step 330, computer system 100 determines a difference between the target shape and a measured shape. For example, computer system 100 may determine a difference between a target distance and an actual or measure distance between the first particle and the second particle. In another example, computer system 100 determines a difference between a target displacement (e.g., distance, direction, velocity, acceleration, etc.) and an actual or measure displacement. In one example, computer system 100 may determine whether the difference between the target shape and the measured shape satisfies or fails to satisfy a set of conditions.

In step 340, computer system 100 generates one or more forces to act on the simulated object to reduce the difference between the target shape and the measured shape. The one or more forces may be a friction force or a dragging force. The forces, for example, may slow the velocity of the first particle or accelerate the first particle toward the second particle such that the difference between the target shape and the measured shape is reduced.

Therefore, in various embodiments, computer system 100 reduces creeping or oozing that may be caused by simulating objects using physically-based numerical techniques. As a result, computer system 100 quickly reduces error between a target shape and a measured shape such that the state of shape of the simulated object is reached at an acceptable point in time to provide visually acceptable simulations. FIG. 3 ends in step 350.

In various embodiments, the basics of shape friction may be most simply described by considering a pair of particles, with the distance between the pair of particles be considered their "shape." Although distance by itself doesn't necessarily convey shape, if every particle in a cloth mesh tries to maintain a specific distance to a set of neighboring particles in the mesh, simultaneously maintaining all of those distances does indeed maintain the shape of the cloth over each particles neighborhood. The above description may be applied to other simulated objects, such as hair, grass, trees, and other plants.

Figure 4A:
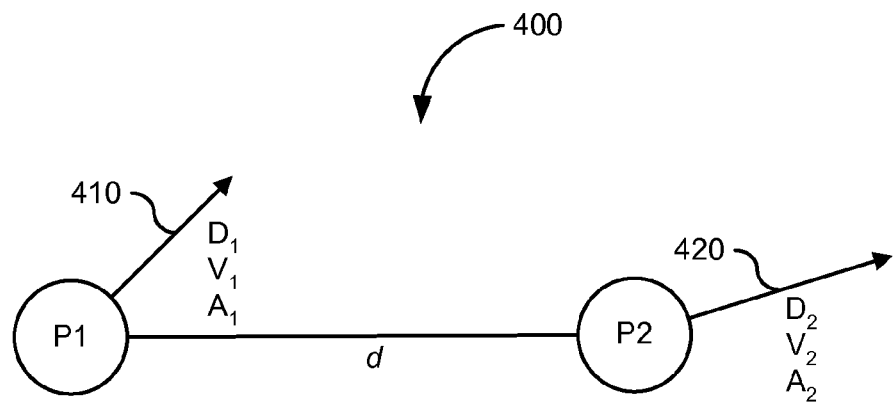
FIG. 4A is simplified block diagram of particles associated with a simulated object in one embodiment according to the present invention.

FIG. 4A is simplified block diagram of a particle P1 and particle P2 associated with a simulated object 400 in one embodiment according to the present invention. In this example, particle P1 is moving in a particular direction $D_1$, at a given velocity $V_1$, and at a given acceleration $A_1$. For example, vector 410 may indicate the direction and/or magnitude of the velocity associated with particle P1. Vector 410 may also indicate the magnitude and direction of a force accelerating particle P1.

Particle P2 is moving in a particular direction $D_2$, at a given velocity $V_2$, and at a given acceleration $A_2$. For example, vector 420 may indicate the direction and/or magnitude of the velocity associated with particle P2. Vector 420 may also indicate the magnitude and direction of a force accelerating particle P2.

In some embodiments, computer system 100 maps particle P1 to P2 as a reference particle or point. Computer system 100 may attempt to match the velocity, direction, acceleration, etc. of particle P1 to the velocity, direction, acceleration, etc. of the reference particle P2.

Consider, for example, the two particles P1 and P2 in space, where the positions of the particles are given by $p_1$ and $p_2$. Let the velocities of the two particles be represented by $v_1$ and $v_2$. Let d represent a target distance desired between the two particles. A shape friction force $F_1$ maybe be defined to act on one of the particles by using equation (1):

$$F_1 = -k(\text{length}(p_1 - p_2) - d)\frac{(p_1 - p_2)}{\text{length}(p_1 - p_2)} \quad (1)$$

where length(p) defines the length of a vector and k is a positive spring-stiffness constant. In various embodiments, computer system 100 generates the friction force F to act on particle P1 to keep particle P1 the distance d from particle P2.

In some embodiments, computer system 100 provides one or more guiding limits on the behavior friction force $F_1$. For example, computer system 100 may provide a tolerance distance that satisfies equation (2):

$$-tol < \text{length}(p_1 - p_2) - d < tol \quad (2)$$

for some chosen tolerance distance tol. In the above form, equation (2) may be viewed as a constraint on d, or the shape. For example, suppose that we choose a tolerance of tol equal to 0.1 where d is equal to 1.5. As long as the particles remained between a distance of 1.4 and 1.6 apart, computer system 100 exerts a force that tries to bring the particles back to a distance of 1.5 apart. However, external forces act so as to force the particles outside of this range, computer system 100 modifies d to maintain the inequality of equation (2).

Accordingly, if computer system 100 determines that the particles have moved to a distance of 1.8 apart, computer system 100 updates the target distance d to be d=1.8−tol=1.7. Thus, when computer system 100 determines $F_1$, the magnitude of $F_1$ has been implicitly limited, because the target distance d may be within some tolerance of the current distance between the particles.

In some embodiments, computer system 100 reduces the forces acting on the particles as the "shape velocity" between the particle P1 and particle P2 moves away from zero. The force $F_1$ that may actually be exerted on particle P1 may be provided equation (3):

$$\left(1 - \frac{\text{length}(v_1 - v_2)}{v_{max}}\right) F_1 \quad (3)$$

which reduces the force $F_1$ by a scaling factor as the difference in the velocities of particle P1 and particle P2 grows. Once the difference in the velocities reaches some threshold $v_{max}$, computer system 100 may turn the friction force completely off. Accordingly, if a predetermined level, point, value, or threshold is reached or exceeded, computer system 100 allows the simulated object to be freely influenced without preserving shape.

In some embodiments, computer system 100 exerts force $F_1$ on particle P1 and an opposite force $-F_1$ on particle P2. As discussed previously, if the particles are forced to far apart, computer system 100 updates the distance d to stay within the range given by equation (2), which effectively changes the shape to which the cloth or hair wants to hold. Similarly, if the differences in velocities between the particles becomes large, computer system 100 further limits the friction force. Once the differences in velocities become smaller again, computer system 100 then allows the shape-friction force to act once more.

In some embodiments, for example with simulated objects such as cloth or hair, computer system 100 records for each particle a separate distance d to each neighboring particle, along with a stiffness k and a maximum velocity of $v_{max}$. The number of neighboring particles may be provided as a parameter to computer system 100. For example, the larger the neighboring set of particles, the more strongly shapes can be held.

Additionally, in some embodiments, the force $F_1$ may be specified as a vector in space according to equation (4):

$$F_1 = -k((p_1 - p_2) - d) \quad (4)$$

with d as a vector, as opposed to a scalar, and with a limit on how much $((p_1-p_2)-d))$ can deviate before dragging d in the direction $p_1-p_2$. The vector d can be recorded either an absolute unchanging coordinate system, or can be based on a local time-varying coordinate system, arising from the kinematic or non-simulated object (i.e., the animated human character).

In some embodiments, computer system 100 provides the force $F_1$ to a single particle, for example, when it makes sense for the "shape" to simply be the position of a particle relative to some local or fixed coordinate scheme. One example of a local or fixed coordinate scheme is described with respect to FIGS. 6 and 7.

Figure 4B:
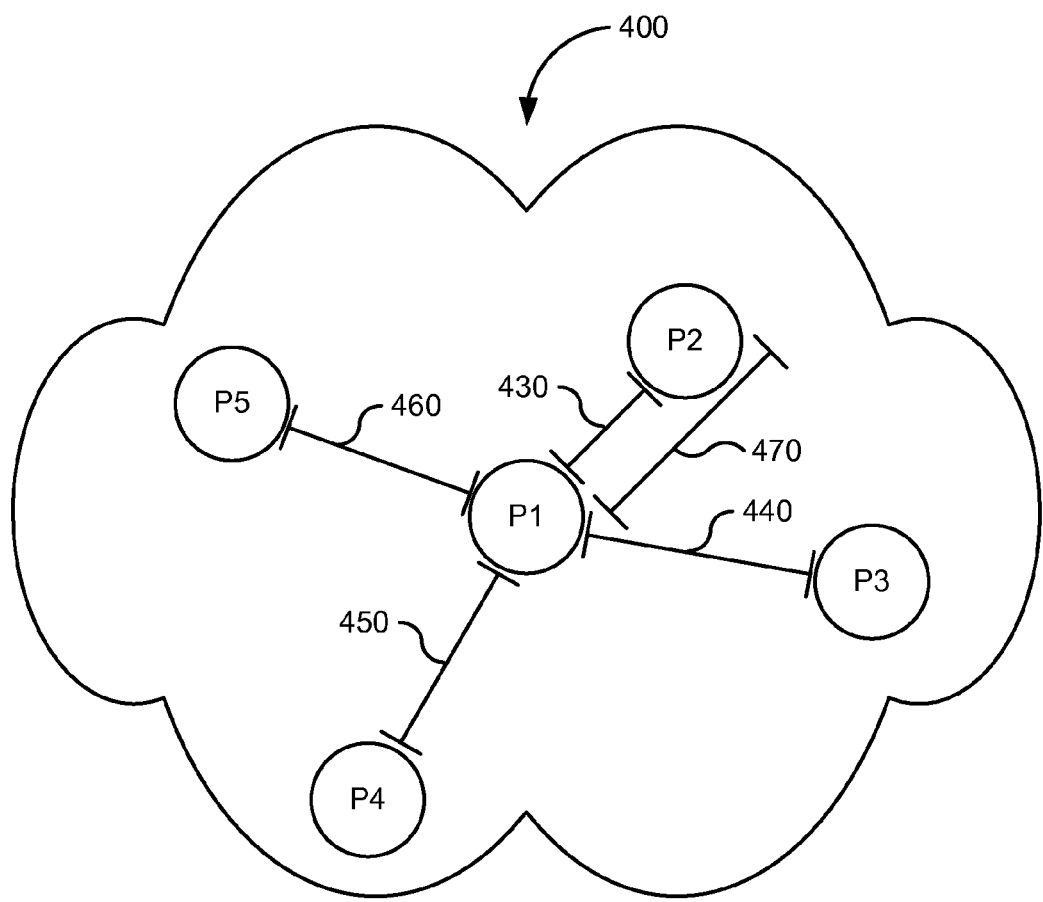
FIG. 4B is simplified block diagram of a particle associated with a simulated object and a reference particle associated with a non-simulated object in one embodiment according to the present invention.

FIG. 4B is a simplified block diagram of particles associated with simulated object 400 in one embodiment according to the present invention. In this example, FIG. 4B includes particles P1, P2, P3, P4, and P5. For example, particles P1, P2, P3, P4, and P5 may form part of a cloth mesh. Particle P1 is separated from particle P2 by a distance 430. Particle P1 is separated from particle P3 by a distance 440. Particle P1 is separated from particle P4 by a distance 450. Particle P1 is separated from particle P5 by a distance 460.

In general, particles P2, P3, P4, and P5 may be considered neighboring particles to particle P1. In some embodiments, particle P5 may be considered a neighboring particle to particle P3. As discussed above, larger sets of particles or smaller set of particles may be used to provide the desired "stiffness" associated with the simulated object.

In various embodiments, computer system 100 attempts to maintain a target distance 470 between particle P1 and particle P2. As discussed further below, computer system 100 may generate one or more forces to act on particle P1 and particle P2 to reduce the difference between the actual distance 430 and the target distance 470 between particles P1 and P2.

Figure 5A:
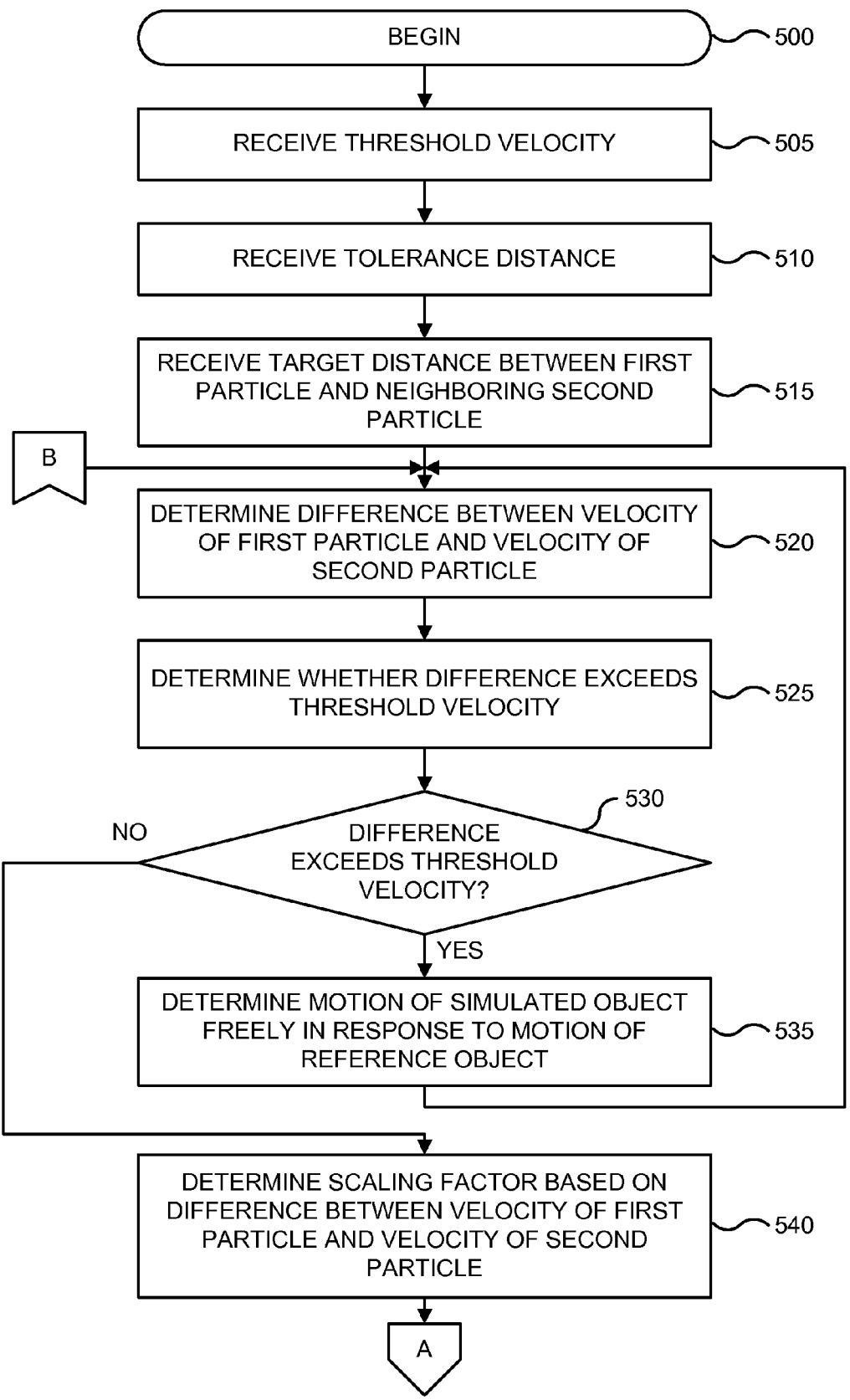
FIGS. 5A and 5B are a flowchart of a method for preserving shape of a simulated object using shape friction during motion in one embodiment according to the present invention.
Figure 5B:
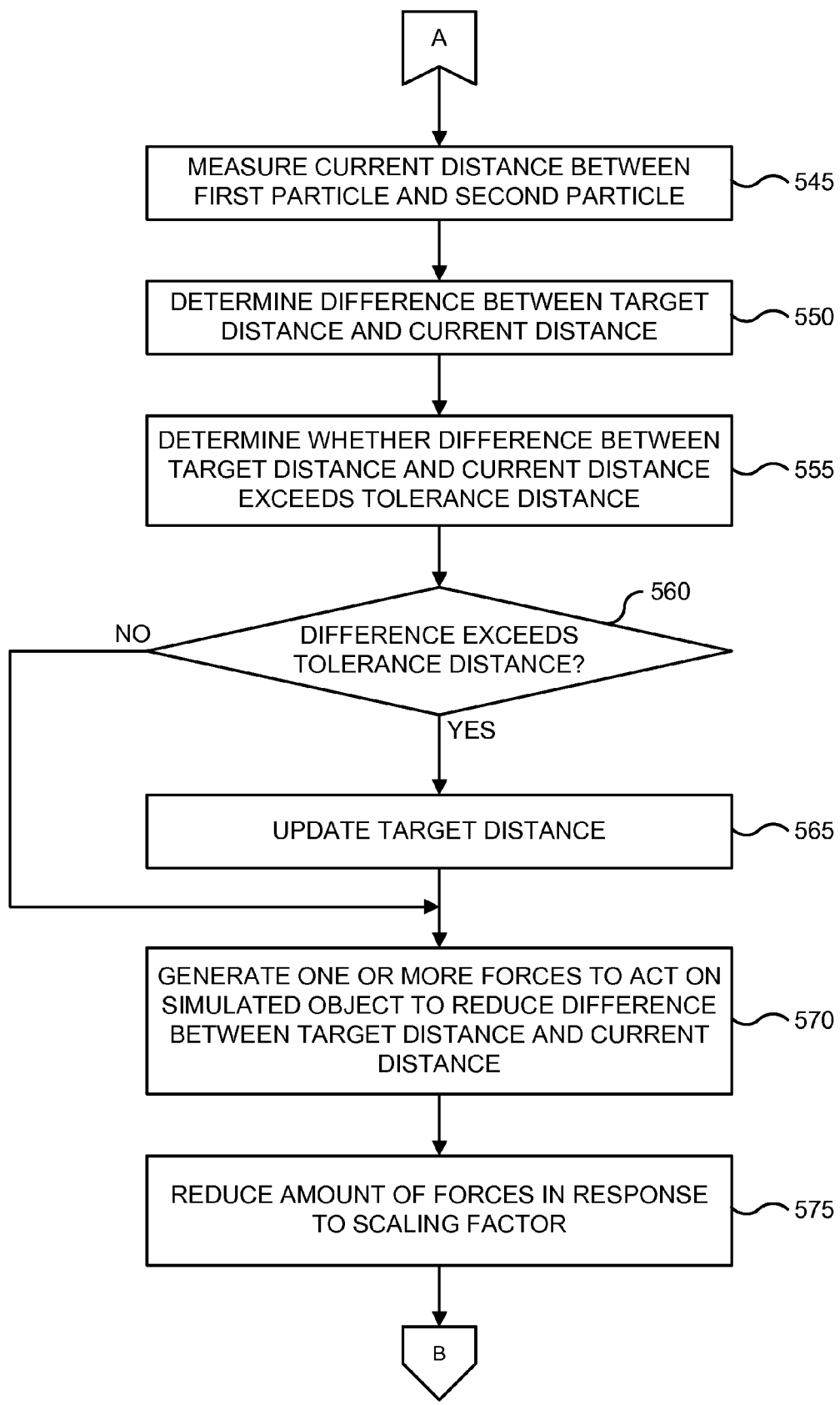

FIGS. 5A and 5B are a flowchart of a method for preserving shape of a simulated object using shape friction during motion in one embodiment according to the present invention. FIG. 5 begins in step 500. In general, the simulated object is associated with a reference object that influences motion and position of the simulated object. In this example, the simulated object includes a set of particles.

In step 505, computer system 100 receives a velocity threshold (e.g., $v_{max}$). In step 510, computer system 100 receives a tolerance distance (e.g., tol). In step 515, computer system 100 receives a target distance between a first particle (e.g., particle P1 of FIG. 4A) and a neighboring second particle (e.g., particle P2 of FIG. 4A).

In step 520, computer system 100 determines a difference between velocity of the first particle and velocity of the second particle. In step 525, computer system 100 determines whether the difference between velocities exceeds the velocity threshold. In step 530, if the difference between the velocities exceeds (or meets) the velocity threshold, in step 535, computer system 100 determines motion (and position) of the simulated object in response to motion (and position) of a reference object. The flowchart then continues in step 520. In step 530, if the difference between velocities does not exceed the velocity threshold, in step 540, computer system 100 determines a scaling factor based on the difference between the velocity of the first particle and the velocity of the second particle. FIG. 5A ends in step 540.

FIG. 5B begins in step 545, continuing from FIG. 5A. In step 545, computer system 100 measures a current distance between the first particle and the second particle. In step 550, computer system 100 determines a difference between the target distance and the measured current distance. In step 555, computer system 100 determines whether the difference between the target distance and the measured current distance exceeds the tolerance distance.

In step 560, if the difference between the target distance and the measured distance exceeds the tolerance distance, in step 565, computer system 100 updates the target distance. For example, computer system 100 may increase or decrease the target distance by the tolerance distance.

In step 570, computer system 100 generates one or more forces to act on the simulated object (e.g., on the first particle and/or on the second particle) to reduce the difference between the target shape and the measured current shape. In step 575, computer system 100 reduces the amount of the one or more forces in response to the scaling factor. In some embodiments, computer system 100 reduces the amount of the one or more forces to nothing in response to the scaling factor if the difference between the target shape and the measured shape exceeds the tolerance distance and/or the velocity threshold is exceeded. FIG. 5B ends in step 575.

Accordingly, computer system 100 eliminates or reduces the creeping or oozing behavior of the simulated object by providing internal shape friction forces, while still allowing the simulated object to move correctly with motion of an associated non-simulated object. Advantageously, computer system 100 allows the simulated object to move and/or change its shape or wrinkle pattern as little as possible, subject to being positioned correctly or in a visually pleasing manner on the character.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for simulating motion of objects, the method comprising:
   receiving, at one or more computer systems, a target shape associated with an object whose motion is determined by a simulation according to a model defining physics of the simulation;
   determining, with one or more processors associated with the one or more computer systems, a difference between the target shape and a measured shape associated with the object in the simulation;
   manipulating, with the one or more processors associated with the computer system, motion of the object to be inconsistent with the model defining the physics of the simulation to reduce the difference between the target shape and the measured shape; and
   storing the manipulated motion of the object in a storage device associated with the one or more computer systems.

2. The method of claim 1 further comprising:
   updating the target shape when the difference between the target shape and the measured shape exceeds a predetermined tolerance.

3. The method of claim 2 wherein updating the target shape comprises reducing the target shape to move the target shape closer to the measured shape.

4. The method of claim 1 wherein receiving the target shape associated with the object comprises receiving a target distance between a first portion of the object and a second portion of the object.

5. The method of claim 1 further comprising:
   measuring distance between a first particle associated with the object and a second particle associated with the object to determine the measured shape associated with the object.

6. The method of claim 1 wherein determining the difference between the target shape and the measured shape associated with the object comprises determining a difference between a target distance and a measured distance.

7. The method of claim 1 wherein determining the difference between the target shape and the measured shape associated with the object comprises determining a difference between a target displacement and a measured displacement.

8. The method of claim 1 wherein manipulating the motion of the object to be inconsistent with the model defining the physics of the simulation to reduce the difference between the target shape and the measured shape comprises generating one or more forces not related to the rest state of the object to act on the object to further reduce the difference between the target shape and the measured shape.

9. The method of claim 8 further comprising:
   reducing the amount of the one or more forces based on a scaling factor determined in response to a difference between velocity of a first particle associated with the object and velocity of a second particle associated with the object as the difference between velocities approaches a predetermined threshold.

10. The method of claim 8 further comprising:
determining shape of the object in response to a reference object when the difference between velocities exceeds the predetermined threshold.

11. The method of claim 10 wherein the reference object comprises a non-simulated character object.

12. The method of claim 1 wherein the simulated object comprises a cloth object.

13. A non-transitory computer readable medium storing computer-executable code for simulating motion of objects, the computer-readable storage medium comprising:
code for receiving a target shape associated with an object whose motion is determined by a simulation according to a model defining physics of the simulation;
code for determining a difference between the target shape and a measured shape associated with the object in the simulation; and
code for manipulating motion of the object to be inconsistent with the model defining the physics of the simulation to reduce the difference between the target shape and the measured shape.

14. The computer-readable medium of claim 13 further comprising:
code for updating the target shape when the difference between the target shape and the measured shape exceeds a predetermined tolerance.

15. The computer-readable medium of claim 14 wherein the code for updating the target shape comprises code for reducing the target shape to move the target shape closer to the measured shape.

16. The computer-readable medium of claim 13 wherein the code for receiving the target shape associated with the object comprises code for receiving a target distance between a first portion of the object and a second portion of the object.

17. The computer-readable medium of claim 13 further comprising:
code for measuring distance between a first particle associated with the object and a second particle associated with the object to determine the measured shape associated with the object.

18. The computer-readable medium of claim 13 wherein the code for determining the difference between the target shape and the measured shape associated with the object comprises code for determining a difference between a target distance and a measured distance.

19. The computer-readable medium of claim 13 wherein the code for determining the difference between the target shape and the measured shape associated with the object comprises code for determining a difference between a target displacement and a measured displacement.

20. The computer-readable medium of claim 13 wherein the code for manipulating the motion of the object to be inconsistent with the model defining the physics of the simulation to reduce the difference between the target shape and the measured shape comprises code for generating one or more forces not related to the rest state of the object to act on the object to further reduce the difference between the target shape and the measured shape.

21. The computer-readable medium of claim 20 further comprising code for reducing the amount of the one or more forces based on a scaling factor determined in response to a difference between velocity of a first particle associated with the object and velocity of a second particle associated with the object as the difference between velocities approaches a predetermined threshold.

22. The computer-readable medium of claim 20 further comprising:
code for determining shape of the object in response to a reference object when the difference between velocities exceeds the predetermined threshold.

23. A system for simulating objects, the system comprising:
a processor; and
a memory coupled to the processor and configured to store a set of instructions, the set of instructions including:
instructions configured to receive a target shape associated with an object whose motion is determined by a simulation according to a model defining physics of the simulation;
instructions configured to determine a difference between the target shape and a measured shape associated with the object in the simulation; and
instructions configured to manipulate motion of the object to be inconsistent with the model defining the physics of the simulation to reduce the difference between the target shape and the measured shape.

24. The system of claim 23 wherein the set of instructions further include:
instructions configured to update the target shape when the difference between the target shape and the measured shape exceeds a predetermined tolerance.

25. The system of claim 24 wherein the set of instructions further include:
instructions configured to reduce the target shape to move the target shape closer to the measured shape to update the target shape.

26. The system of claim 23 wherein the set of instructions configured to receive the target shape include:
instructions configured to receive a target distance between a first portion of the object and a second portion of the object.

27. The system of claim 23 wherein the set of instructions further include:
instructions configured to measure distance between a first particle associated with the object and a second particle associated with the object to determine the measured shape associated with the object.

28. The system of claim 23 wherein the set of instructions further include:
instructions configured to determine a difference between a target distance and a measured distance to determine the difference between the target shape and the measured shape.

29. The system of claim 23 wherein the set of instructions further include:
instructions configured to determine a difference between a target displacement and a measured displacement to determine the difference between the target shape and the measured shape.

30. The system of claim 23 wherein the instructions configured to manipulate the motion of the object to be inconsistent with the model defining the physics of the simulation to reduce the difference between the target shape and the measured shape include instructions configured to generate one or more forces not related to the rest state of the object to act on the object to further reduce the difference between the target shape and the measured shape.

31. The system of claim 30 wherein the set of instructions further include:
instructions configured to reduce the amount of the one or more forces based on a scaling factor determined in response to a difference between velocity of a first particle associated with the object and velocity of a second particle associated with the object as the difference between velocities approaches a predetermined threshold.

32. The system of claim 30 wherein set of instructions further include:

instructions configured to determine shape of the simulated object in response to a reference object when the difference between velocities exceeds the predetermined threshold.

* * * * *